United States Patent
Eiband

(10) Patent No.: US 7,438,162 B2
(45) Date of Patent: Oct. 21, 2008

(54) CALIPER BRAKE WITH DISENGAGED POSITION

(75) Inventor: Karl Eiband, Marktoberdorf (DE)

(73) Assignee: Chr. Mayr GmbH & Co., KG, Mauerstetten (DE)

( * ) Notice: Subject to any disclaimer, the term of this patent is extended or adjusted under 35 U.S.C. 154(b) by 94 days.

(21) Appl. No.: 10/561,911

(22) PCT Filed: Jul. 2, 2004

(86) PCT No.: PCT/EP2004/007243

§ 371 (c)(1),
(2), (4) Date: Dec. 21, 2005

(87) PCT Pub. No.: WO2005/003583

PCT Pub. Date: Jan. 13, 2005

(65) Prior Publication Data

US 2007/0107997 A1    May 17, 2007

(30) Foreign Application Priority Data

Jul. 4, 2003 (DE) ................................ 103 30 306

(51) Int. Cl.
*B60T 13/04* (2006.01)

(52) U.S. Cl. ...................................... 188/171; 188/72.3

(58) Field of Classification Search ............... 188/171, 188/173, 161, 163, 164, 156, 72.3, 216; 192/70.252, 192/111.4, 111.16
See application file for complete search history.

(56) References Cited

U.S. PATENT DOCUMENTS

| | | | | |
|---|---|---|---|---|
| 3,983,971 | A * | 10/1976 | Kawai | 188/171 |
| 5,873,434 | A * | 2/1999 | Sugita et al. | 187/288 |
| 5,944,150 | A * | 8/1999 | Hikari | 188/161 |
| 2001/0045331 | A1* | 11/2001 | Hikari | 188/161 |

* cited by examiner

*Primary Examiner*—Robert A. Siconolfi
*Assistant Examiner*—Vu Q Nguyen
(74) *Attorney, Agent, or Firm*—W. Norman Roth

(57) ABSTRACT

The invention relates to a caliper brake for a brake disc, in particular for elevator drives. Said brake comprises a brake body that is mounted on a fixed bolt (7) in a floating manner (1) and a brake caliper (2) that impinges on the brake disc (3) from the outer periphery of the latter, in addition to a solenoid (14) that is integrated into the brake body (1) to electromagnetically pull a spring-loaded armature disc (4) against the brake body (1). Said armature disc (4) and the section of the brake caliper (2) lying axially opposite are equipped with friction linings (5, 6) for engaging with the two end faces of the brake disc (3). To release or centre the caliper brake in relation to the brake disc at any time, a dual-arm rocker lever or bracket (8) is pivotally mounted on the fixed bolt, one limb (15B) of said lever or bracket being connected to the peripheral surface of the armature disc (4) and the other limb (15A) to the brake caliper, in such a way that the rocker lever or bracket (8) displaces the armature disc (4) when the brake is disengaged, simultaneously redirecting said movement into a displacement of the brake caliper (2) in the opposite direction, in order to obtain an air gap (s/2) on both sides of the brake disc (3).

2 Claims, 5 Drawing Sheets

CALIPER BRAKE WITH DISENGAGED POSITION

The present invention relates to caliper brakes peripherally engaging a brake disc on both sides to brake it down and adapted to urge friction linings against either face of the brake disc when operated to brake. In caliper brakes of this kind, the brake body must be supported to "float" so that the caliper can adapt to the position of the brake disc as the friction linings wear down. This kind of caliper brake is acknowledged to be known in the preamble of patent claim 1.

Applicant's floating-mount caliper brakes are state of the art. At the customers', specific embodiments were found to generate grinding noises as the friction linings initially touch the disc. These noises were deemed to be unacceptable.

A first solution of the problem was seen in the provision of means for adjusting the air gap of the caliper-side friction surface by means of three screws and to use one or two compression springs to set the pressure the brake exerts on these screws. Under maximum operational load. the drive would at times experience a flexural torque acting to deflect the brake disc towards the brake mounting structure, the deflection exceeding the air gap of the brake. As a result, the friction lining constantly rubs against the armature disc under the pressure exerted by the compression springs. In many cases, such grinding noises are unacceptable. For example, brakes in elevators are noise-silenced and their air gap cannot be increased as needed, resulting in a loud noise as the brake engages. Where the brake disc is part of an elevator drive motor, the brake engages during load changes (persons entering or leaving the elevator car). Electromagnetically disengaged caliper brakes are actuated in the absence of current by the corresponding compression spring of the brake.

As the brake disengages, i.e. As the armature disc is electromagnetically attracted onto the brake body, an air gap forms in which the brake disc is free to rotate. Grinding or slip noises are generated even if the brake and its mounting structure are manufactured to tight tolerances. These noises are the louder the greater the so-called "wobble" of the disc and the narrower the air gap is adjusted to be at the electromagnetically released brake. Still, an air gap so narrow is needed to ensure a low engagement noise of the brake.

On the basis of the above, it is the object underlying the invention to further develop a caliper brake of the kind initially stated so as to provide for, and maintain, a uniform air gap on both the left- and the right-hand side of the brake disc. Such a uniform air gap on both sides is to be provided even in case the friction linings wear unevenly.

This object is attained by the features stated in patent claim 1. A dual-arm rocker lever or bracket-type friction and clamping mechanism is fastened at one end to the axially movable armature disc and is floatingly fastened at the other end to the brake housing or to the straddling caliper, which itself is fixed to the brake housing. Movements of the armature disc cause it to flex slightly from the starting position, whereby a uniform air gap will form on both sides of the brake disc. The fulcrum of the rocker arm device is located on the fixed bolt which floatingly supports the brake housing; the fixed bolt itself is anchored to a stationary machine housing.

As the brake is disengaged through an air gap having the width s, an air gap s/2 wide will form on both sides of the brake,whereby any grinding noise will be prevented reliably.

The present invention will be explained in greater detail under reference to the attached drawings.

FIG. 1 shows the brake in the engaged/braked condition;

FIG. 2 depicts the brake in the disengaged condition, showing the balancing effect of rocker arm 8;

FIG. 3 shows the brake in the braked-down condition with its friction linings substantially worn or brake disc 3 axially displaced through external influence;

Figure 5:
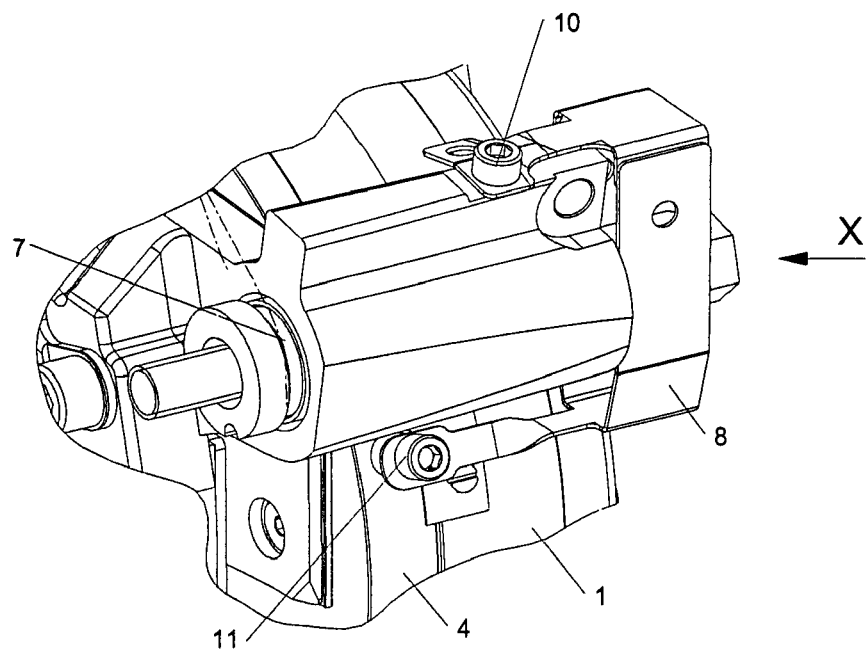
FIG. 5 shows a specific embodiment of an inventive brake.
Figure 5A:
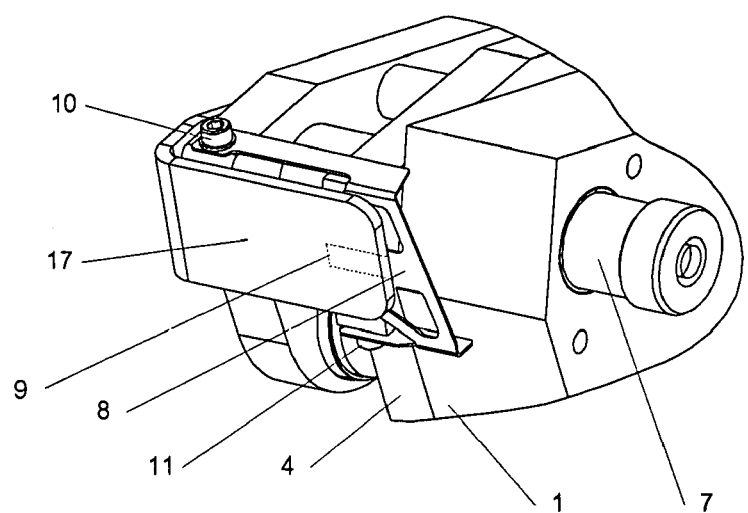
Figure 6:
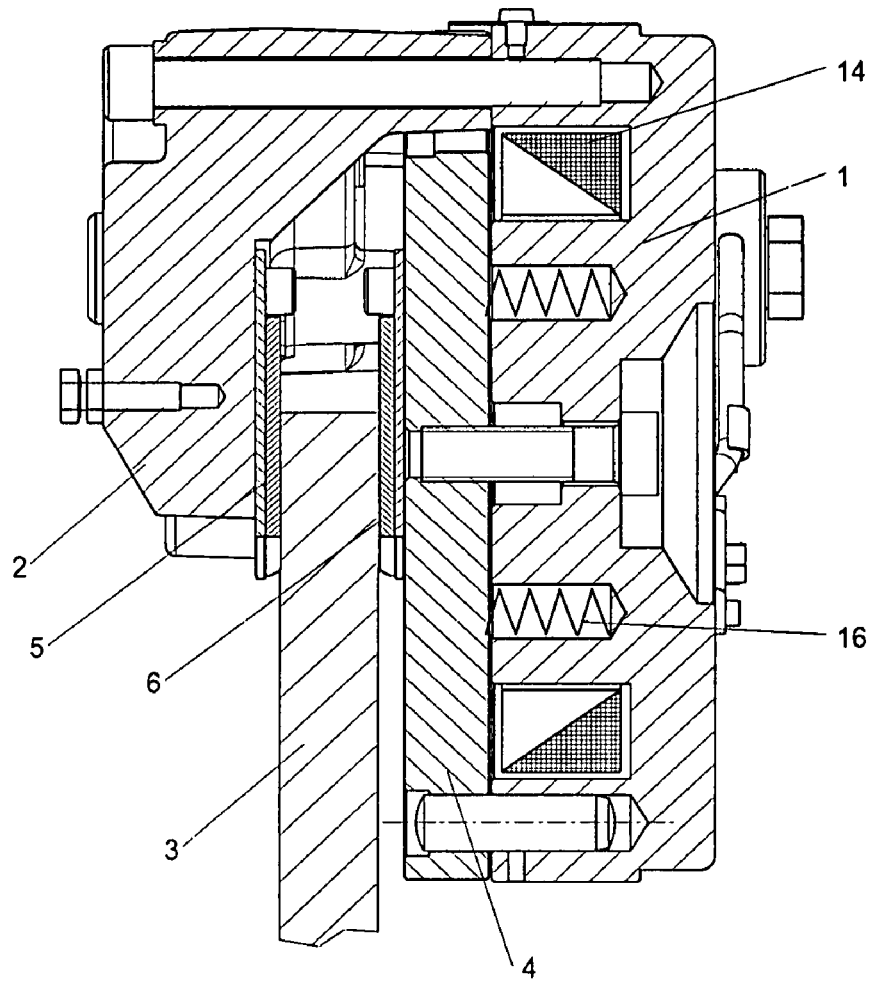

FIGS. 5a, b and c show additional embodiments; and FIG. 6 shows a vertical section in parallel with fixed bolt 7.

The idea underlying the invention is to convert armature movements relative to the solenoid support to oppositely directed movements of the solenoid support itself, such oppositely directed movements then also being relative to the opposite caliper-side friction surface as the latter is firmly connected to the solenoid support. Adjustment of the starting position of the armature disc is effected by rocker lever 8 frictionally engaging stationary guide bolt 7.

Figure 1:
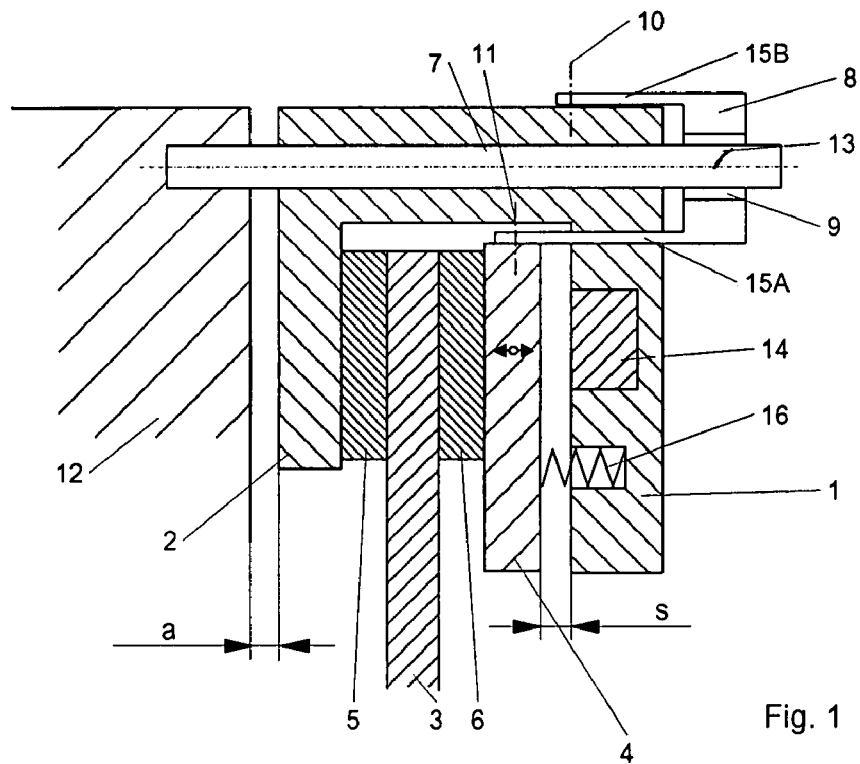
FIGS. 1-3 illustrate the principles underlying the inventive brake, that is.
Figure 2:
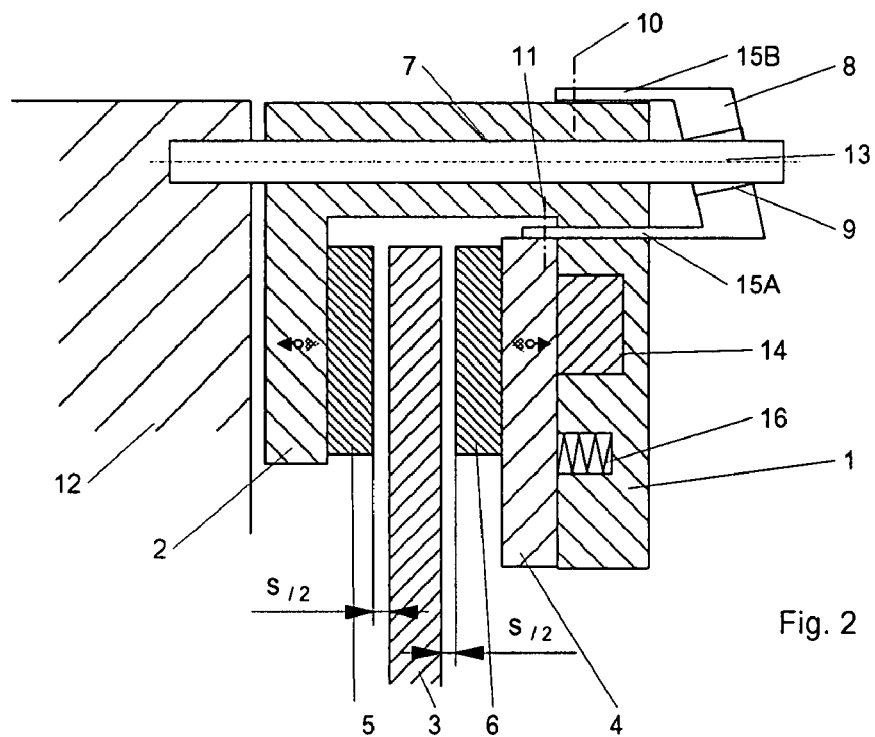
Figure 3:
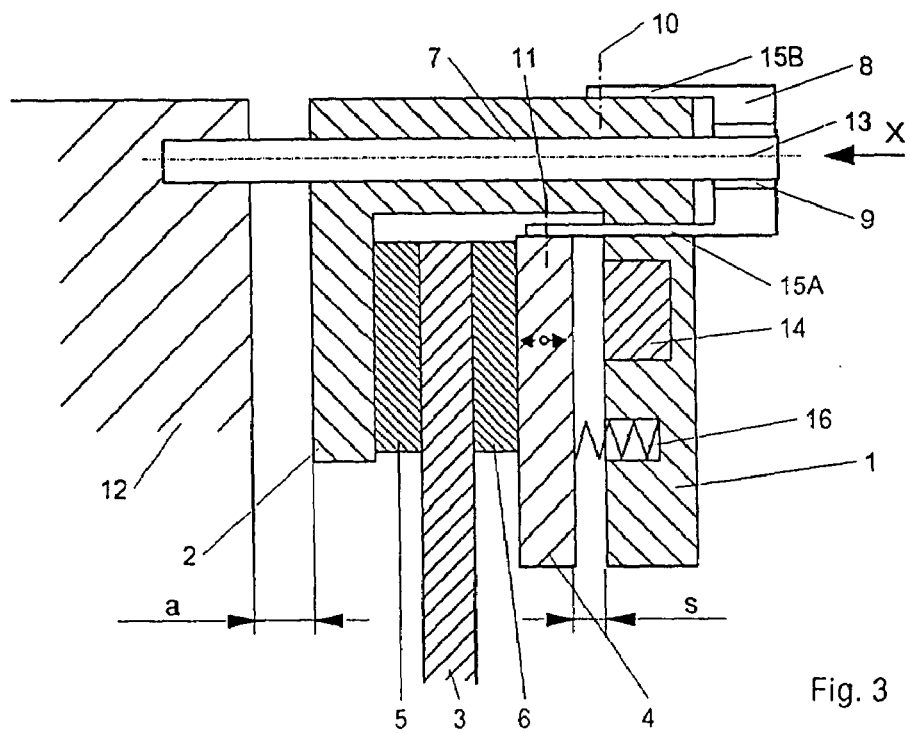
Figure 4:
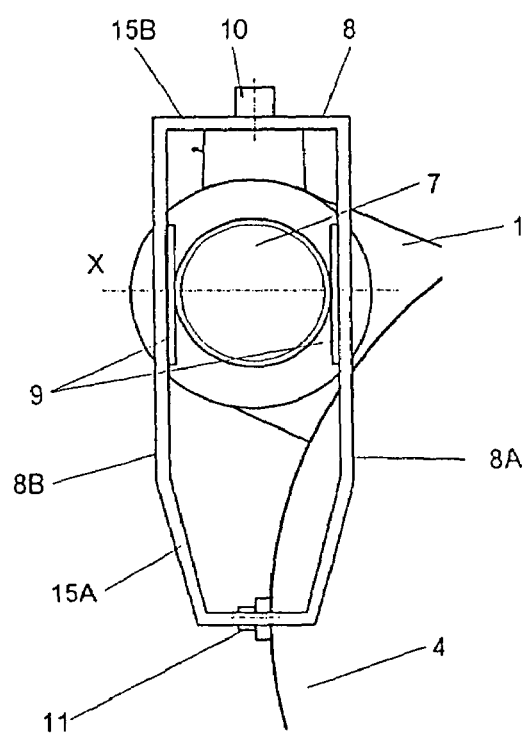
FIG. 4 shows a view of the brake seen in the direction of arrow X in FIG. 3 or 5.

Rocker lever 8 is a member shaped of spring-grade steel strip to have two opposite limbs 8A, 8B engaging both sides of fixed bolt 7, said limbs having friction linings 9 on their inner surfaces to maintain the frictional engagement of the rocker lever with fixed bolt, as shown in FIG. 4. The axial frictional force exerted on the guide bolt is determined by the amount of the resilient outward deflection and by the nature of the friction linings. The rocker lever has two oppositely disposed flexible tongues 15A, 15B, with one tongue 15A connected to armature disc 4 and the other tongue 15B connected to caliper 2 both in a clearance-free manner. The lever ratio of the tongues to the center of the guide bolts is approximately 1:1. The friction linings 9 on the inner surfaces of the opposite limbs 8A, 8B of the rocker lever 8 tangentially contact diametrically opposite points on the fixed bolt 7 thereby frictionally pinching the bolt between the limbs at a fulcrum 13. Since the rocker lever 8 is frictionally movable along the fixed bolt 7, the fulcrum 13 is movable along the fixed bolt 7 so that the rocker lever may pivot about the moveable fulcrum 13 at different locations along the fixed bolt 7.

With the brake engaged and the position of the brake disc altered by some load change, tongues 15A, 15B act to axially shift the clamping mechanism in its entirety on the guide bolt. Energizing brake solenoid 14 will move armature disc 4 toward solenoid support 1. Armature-side tongue 15A transfers this movement to rocker lever 8, which will initiate an opposite directed movement of tongue 1 5B if its frictional engagement of guide bolt 7 is sufficient. As a result, the air gaps between brake disc 3 and the two friction linings will be approximately the same and equal to s/2.

FIG. 5a shows another embodiment, the difference being that rocker lever 8 and its friction linings 9 cannot shift on bolt 7 directly; instead, another bracket 17 is provided and connected with bolt 7.

Figure 5B:
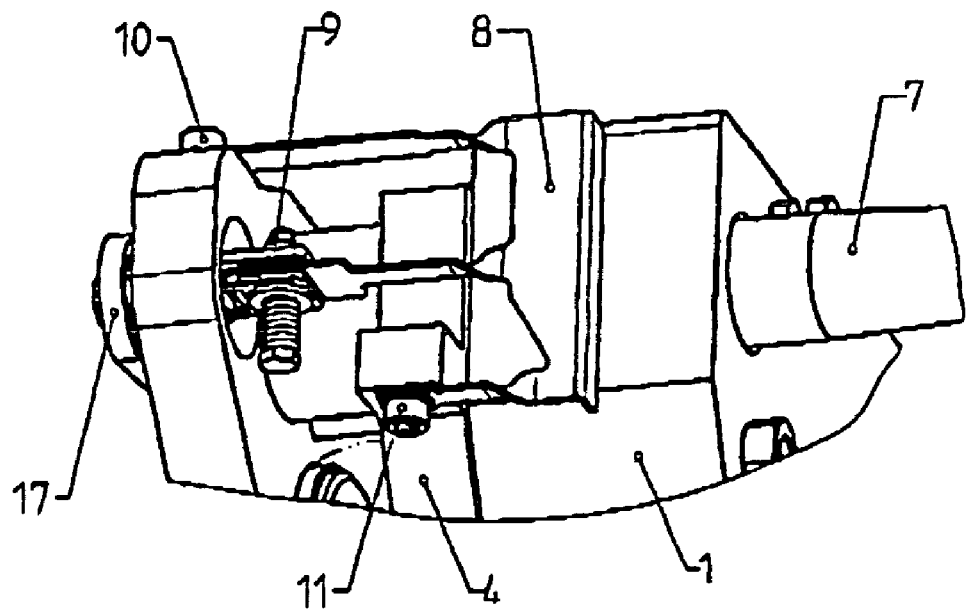
Figure 5C:
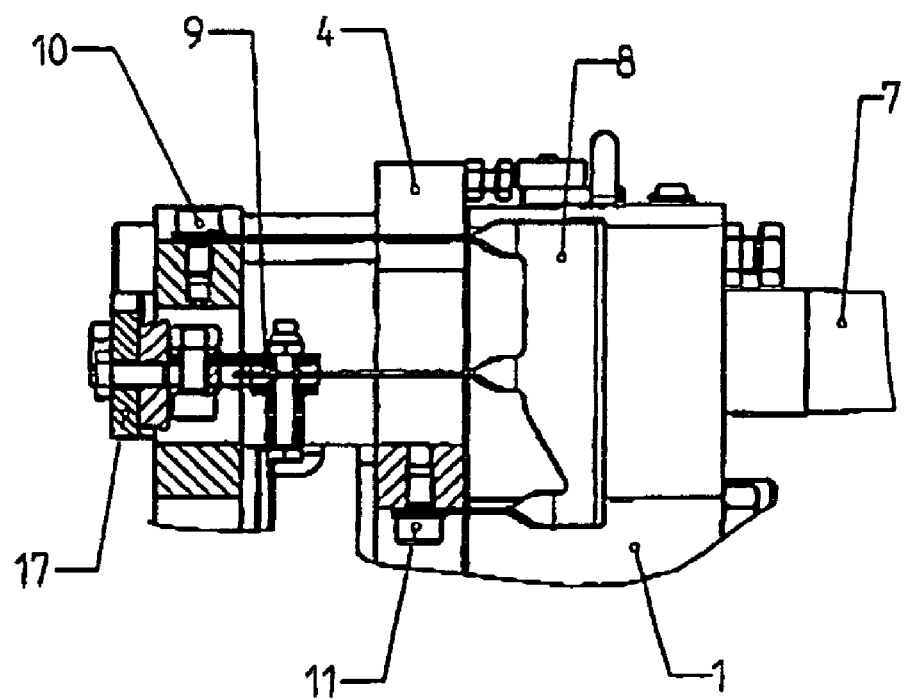

FIGS. 5b, 5c show still another embodiment in which again a separate bracket 17 is connected with bolt 7, with axial displacement effected between rocker lever 8 and bracket 17 by the frictional engagement of friction lining 9.

LIST OF REFERENCE CHARACTERS 1 brake body/solenoid support
2 caliper
3 brake disc
4 armature disc
5 left-hand friction lining 6 right-hand friction lining
7 fixed bolt
8 rocker lever
8A right-hand limb of 8 in FIG. 4
8B left-hand limb of 8 in FIG. 4
9 friction linings on rocker lever 8
10 fastening screw on the caliper
11 fastening screw on the armature disc
12 stationary housing
13 fulcrum of 8 on fixed bolt 7
s air gap between brake body 1 and armature disc 4
s/2 left-and right-hand air gap between brake disc 3 and left-and right-hand friction linings 5,6
a distance between stationary housing 12 and caliper 2
14 solenoid in 1
15A flexible tongue, screwed onto armature disc 4
15B flexible tongue, screwed onto caliper 2
16 compression springs in brake
17 bracket (or similar member)

The invention claimed is:

1. Caliper brake for a brake disc, comprising a brake body (1) mounted to float on a fixed bolt (7), a caliper (2) for straddling the periphery of a brake disc (3), and a solenoid (14) to magnetically attract a spring-biased armature disc (4) toward said brake body (1), said armature disc (4) and the axially opposite portion of said caliper (2) having friction linings (5, 6) thereon to engage the two faces of brake disc (3), characterized in that a dual-arm rocker lever (8) is frictionally mounted on said fixed bolt (7) or is frictionally mounted on a bracket (17) on said fixed bolt, the rocker lever being moveable in the direction of the length of said fixed bolt and having two tongues (15A and 15B), one tongue (15A) connected to the peripheral surface of said armature disc (4) and the other tongue (15B) connected to said caliper, said connections being such that, while said brake is engaged, axial movement of said brake disc axially moves said rocker lever on said bolt, and as the brake disengages, said rocker lever (8) converts movement of said armature disc (4) to an oppositely directed movement of caliper (2) so as to provide an essentially equal air gap (s/2) on either side of said brake disc (3).

2. Caliper brake as in claim 1, characterized in that said rocker lever (8) comprises two mutually parallel sections (8A, 8B) having friction linings (9) thereon which frictionally engage said fixed bolt (7) at opposite sides of said bolt to so define a movable fulcrum (13) on said fixed bolt (7).

* * * * *